United States Patent
Pulugurta

(10) Patent No.: US 9,307,455 B2
(45) Date of Patent: Apr. 5, 2016

(54) METHODS AND SYSTEMS FOR TRANSITIONING A COMMUNICATION SESSION FROM A SOURCE BASE STATION TO A TARGET BASE STATION WITHOUT TERMINATING THE SESSION

(75) Inventor: Srikanth Pulugurta, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1353 days.

(21) Appl. No.: 12/755,689

(22) Filed: Apr. 7, 2010

(65) Prior Publication Data

US 2011/0249649 A1    Oct. 13, 2011

(51) Int. Cl.
| | |
|---|---|
| *H04W 36/00* | (2009.01) |
| *H04W 36/14* | (2009.01) |
| *H04W 84/04* | (2009.01) |
| *H04W 88/04* | (2009.01) |
| *H04W 88/06* | (2009.01) |

(52) U.S. Cl.
CPC .......... *H04W 36/0016* (2013.01); *H04W 36/14* (2013.01); *H04W 84/045* (2013.01); *H04W 88/04* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 5,978,669 | A | 11/1999 | Sanmugam |
| 5,995,839 | A | 11/1999 | Coursey et al. |
| 2004/0218575 | A1 | 11/2004 | Ibe et al. |
| 2008/0069065 | A1 | 3/2008 | Wu et al. |
| 2008/0076386 | A1 | 3/2008 | Khetawat et al. |
| 2010/0062770 | A1 | 3/2010 | Flynn et al. |

OTHER PUBLICATIONS

International Search Report for PCT/US2011/031538 (which claims priority to U.S. Appl. No. 12/755,689), mailed on Jul. 25, 2011.
Written Opinion of the International Searching Authority for PCT/US2011/031538 (which claims priority to U.S. Appl. No. 12/755,689), mailed on Jul. 25, 2011.

*Primary Examiner* — Jackie Zuniga Abad

(57) ABSTRACT

Methods and systems are provided for transitioning an active communication session of a mobile station from being conducted over a communication path that includes a source base station to being conducted over a communication path that includes a target base station, without terminating the communication session. A wireless communication device situated within a source coverage area of a source base station operates as a clone of the mobile station that is situated within a source coverage area of the source base station and also within a target coverage area of the target base station. The transition involves the clone relaying the communication session between the source base station and the mobile station; meanwhile, the target base station (i) establishes an air-interface connection with the mobile station and (ii) detects a handoff-completion trigger, and responsively serves the mobile station over the air-interface connection with respect to the communication session.

25 Claims, 9 Drawing Sheets

METHODS AND SYSTEMS FOR TRANSITIONING A COMMUNICATION SESSION FROM A SOURCE BASE STATION TO A TARGET BASE STATION WITHOUT TERMINATING THE SESSION

BACKGROUND

A wireless communication network may include one or more base stations (each of which may be networked together) in communication with one or more mobile stations using radio-frequency (RF) signals transmitted between the base stations and mobile stations. The wireless communication network could include a radio access network (such as a cellular access network), a wireless local area network (WLAN), a wireless personal area network, and/or any other network capable of wireless communication. The wireless communication network may be provided by a network operator. As examples, SPRINT, VERIZON, AT&T, and T-MOBILE each operate a nationwide radio access network, and several of these operators also operate a nationwide network of WLAN access points.

The total geographic range over which a given base station provides wireless service may be generally referred to as a coverage area. However, this overall coverage area may be divided into one or more geographic regions, each of which may be referred to by a term such as sector. Additionally or alternatively, the base station may facilitate wireless communication over one or more RF carrier frequencies, each of which may be referred to as a carrier. The overall coverage area may also be divided by one or more other suitable distinguishing characteristics or parameters. A given sector, carrier, other distinguishing characteristic, or combination thereof may be referred to herein as a coverage area. Further, a combination of coverage areas may also be collectively referred to as a coverage area. As used in the remainder of this written description, the term "coverage area" refers to whatever collection of hardware, firmware, software, etc. is used by one or more base stations to provide service on a given carrier in a given geographic region, and is not used hereinafter to characterize a geographic region and nothing else.

The operator of a wireless communication network may require payment prior to allowing a mobile station to access its wireless communication network. Typically, a mobile station is configured to operate on a "home" network, and the user of the mobile station will often have entered into a postpaid service agreement with the operator of that network, or will have prepaid for use of the network.

In many cases, if the mobile station is not within range of—or otherwise not able to connect to—its home network, the mobile station may be able to connect to a "roaming" network other than the home network. The user of the mobile station may not have prepaid for the right to operate on the roaming network; in this situation, the roaming network may allow the mobile station to operate on the network, but may subsequently require payment from the mobile station user for using the roaming network. It is typically more expensive—and thus less preferred—for a mobile station to operate on a roaming network than it is for the mobile station to operate on its home network.

Each mobile station may be or include any device that is capable of communication with one or more base stations, and each could take the form of or at least include a mobile phone, a personal digital assistant (PDA), a computer (such as a desktop computer, laptop computer, or tablet computer), a portable wireless router, an e-book reader, and/or any number of other forms. A mobile station may be configured such that it may communicate with only a limited number wireless communication networks, or a limited number of a certain type of wireless communication network. For example, a mobile phone may be configured so that it can communicate with only one radio access network at any given time.

OVERVIEW

In current implementations, if a mobile station—perhaps one that is able to communicate with only one radio access network of a given type (e.g., that operates according to a given protocol such as Code Division Multiple Access (CDMA)) at a time—is engaged in a communication session via a first radio access network, but is arranged to prefer to operate on a second radio access network, the mobile station may be required to—in order to switch from the first radio access network to the second—end the communication session, disconnect from the first radio access network, connect to the second radio access network, and then re-establish the (and what would really be a new) communication session. This transition can be quite disruptive.

Described herein are methods and systems for transitioning a communication session from being conducted over a communication path that includes a source base station to being conducted over a communication path that includes a target base station, without terminating the communication session. A determination is made that a mobile station is (i) situated within a target coverage area of a target base station, (ii) situated within a source coverage area of a source base station, and (iii) actively conducting a communication session with an endpoint via the source base station, where conducting the communication session involves operating using an identifier that uniquely identifies at least the communication session to the source base station.

In response to the determination being made, the mobile station is cloned, which involves configuring a wireless communication device other than the mobile station to begin operating in the source coverage area using the above-referenced identifier, which in turn involves relaying the communication session between the source base station and the mobile station.

While the wireless communication device is operating in the source coverage area using the identifier, the target base station (i) establishes an air-interface connection with the mobile station, (ii) detects a handoff-completion trigger, and (iii) responsive to detecting the handoff-completion trigger, serves the mobile station over the air-interface connection with respect to the communication session.

In an exemplary embodiment, described in further detail below, the communication session is relayed between the source base station and the mobile station over a communication path that does not include the target base station. In this embodiment, the communication path could include, for example, a wireless link between the wireless communication device and the mobile station, and/or could include a wired link between the wireless communication device and the mobile station.

In another embodiment, the communication session is relayed between the source base station and the mobile station over a communication path that does include the target base station. In this embodiment, the communication path could include a communication link between the wireless communication device and the target base station, and the air-interface connection with the mobile station. The communication link could be wired and/or wireless. Those having skill in the art will recognize that other communication paths and other means of relaying the communication session are possible without departing from the scope of the claims.

In an exemplary embodiment, the wireless communication device simulates an operational characteristic of the mobile station. The operational characteristic could include, for example, a location and/or a power level of the mobile station, among other possibilities. Simulating the operational characteristic could include reporting the operational characteristic to the base station, and/or operating so as to approximate the operational characteristic as perceived by the base station. And other means of simulating the operational characteristic are possible as well without departing from the scope of the claims.

It should be noted that the above overview is intended to be illustrative and not limiting. Additional and/or different features may be present in some embodiments. And any description of a base station, mobile station, wireless communication device, and/or other network entity operating according to any particular protocol is by way of example and not limitation; any suitable wireless protocol(s) may be used, such as but not limited to 1xRTT CDMA, EV-DO, TDMA, AMPS, GSM, GPRS, UMTS, EDGE, WiMax (e.g. IEEE 802.16), LTE, microwave, satellite, MMDS, Wi-Fi (e.g. IEEE 802.11), Bluetooth, infrared, and/or any other protocol now known or later developed.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF THE DRAWINGS

Figure 1:
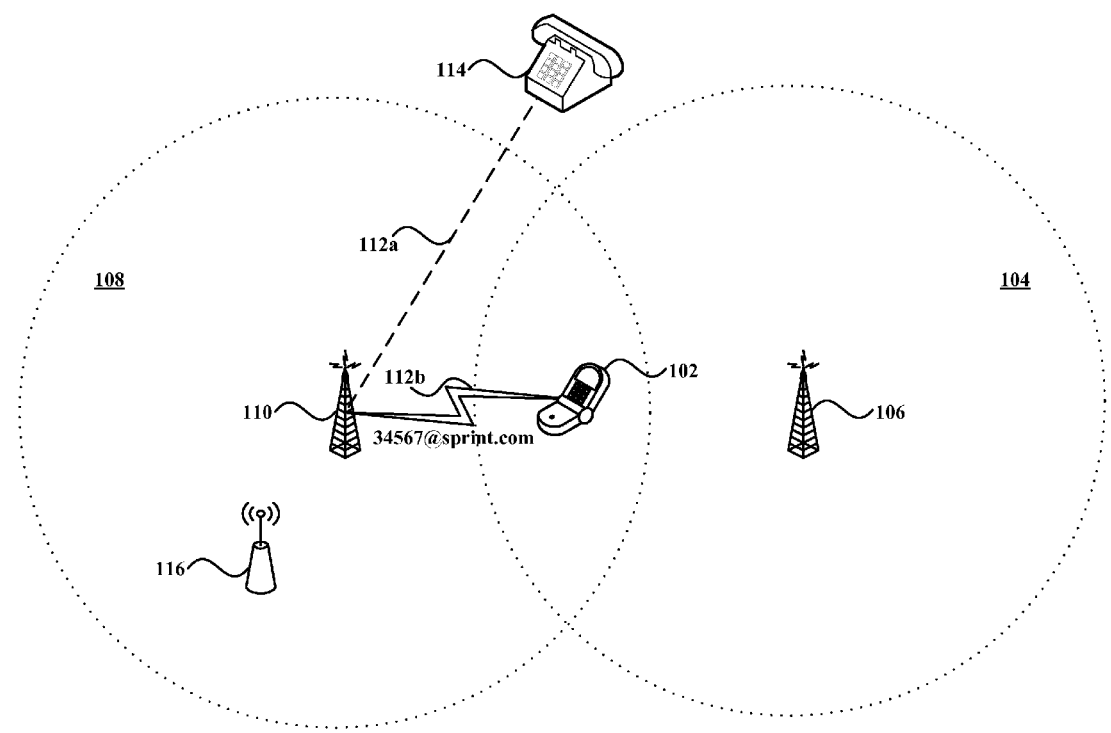
FIGS. 1, 6, 7a, 7b, and 8 depict various communication scenarios occurring in a wireless communication system, in accordance with exemplary embodiments.

FIG. 1 depicts an initial scenario in a wireless communication system, in accordance with exemplary embodiments. As shown in FIG. 1, the wireless communication system includes a mobile station 102, target coverage area 104, target base station 106, source base station 108, source base station 110, endpoint 114, and wireless communication device 116. Also depicted is an active communication session between mobile station 102 and endpoint 114, where the communication session is being conducted at least over communication paths 112a (which may be a routing path between source base station 110 and endpoint 114) and 112b (which in this example is an air-interface connection between source base station 110 and mobile station 102).

Figure 2:
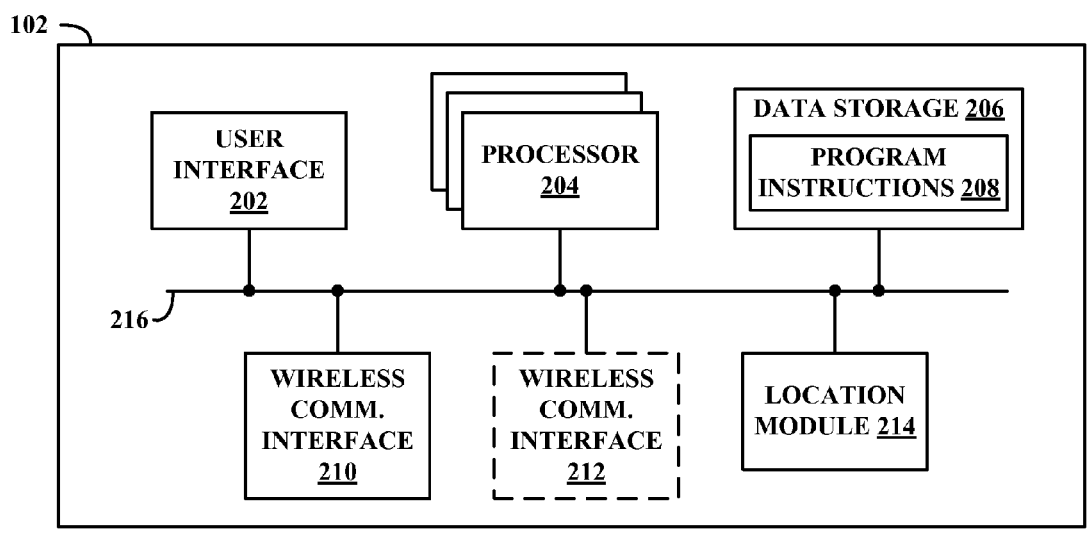
FIG. 2 is a simplified block diagram of a mobile station, in accordance with exemplary embodiments.

FIG. 2 is a simplified block diagram of mobile station 102, which may be used in accordance with exemplary embodiments. As illustrated, mobile station 102 may include a user interface 202, a processor 204, data storage 206 (containing program instructions 208), wireless communication interface 210, optional additional wireless communication interface 212, and location module 214, all connected by a bus or other communication link 216. And other entities not shown in FIG. 2 may be present as well, including any other entities now known or later developed for such devices. Further, mobile station 102 may contain more than one of any one of the entities depicted in FIG. 2. Mobile station 102 may take the form of or include a mobile phone, a personal digital assistant, a portable wireless router, a computer, and/or an e-book reader, among other possibilities.

User interface 202 may function to facilitate interaction with a user of the mobile station. As such, user interface 202 may include a display, a speaker, a microphone, a key input, a touch-screen, and/or any other elements for receiving inputs and/or communicating outputs.

Processor 204 may be, for example, a general-purpose microprocessor and/or a discrete signal processor. Though processor 204 is described here as a single processor, those having skill in the art will recognize that mobile station 102 may contain multiple (e.g., parallel) processors, as depicted in FIG. 2.

Data storage 206 may store a set of machine-language program instructions 208 that are executable by processor 204 to carry out various functions described herein. Alternatively, some or all of the functions could instead be implemented through hardware. In addition, data storage 206 may store various data to facilitate carrying out various functions described herein. In addition, data storage 206 may hold user-interface data, among many other possibilities.

Wireless communication interface 210 may include a chipset suitable for communicating with one or more devices such as, for example, target base station 106, source base station 110, wireless communication device 116, and/or endpoint 114. The chipset could be suitable for CDMA communication. The chipset, or wireless communication interface 210 in general, may also or instead be able to communicate with other types of networks and devices, such as EV-DO networks, wireless local area networks (WLANs), Bluetooth devices, and/or one or more additional types of networks and devices. Mobile station 102 may also include optional additional wireless communication interface 212 that functions in substantially the same manner as wireless communication interface 210.

Location module 214 could be, for example, any known or hereafter-developed global positioning system (GPS) receiver, suitable for receiving and decoding GPS signals for location and timing purposes, perhaps among other purposes. Additionally or alternatively, location module 214 could be configured to determine a position by comparing relative strengths of RF signals received by one or more base stations, mobile stations, wireless communication devices, or other entities. Location module 214 could take any number of other forms as well.

Figure 3:
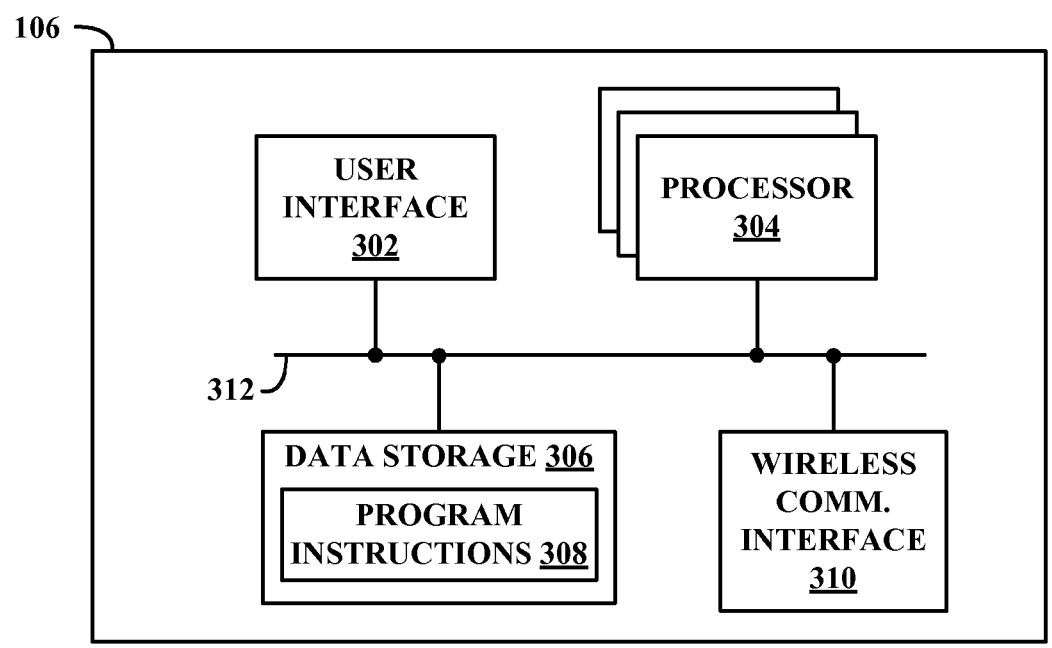
FIG. 3 is a simplified block diagram of a base station, in accordance with exemplary embodiments.

FIG. 3 is a simplified block diagram of target base station 106, which may be used in accordance with exemplary embodiments. As illustrated, target base station 106 may include a user interface 302, a processor 304, data storage 306 containing program instructions 308, and wireless communication interface 310, all connected by a bus or other communication medium 312. The entities shown in FIG. 3 may operate in a manner similar to those entities of the same name that are depicted in FIG. 2.

Further, wireless communication interface 310 may provide one or more coverage areas, such as cells and sectors, for communicating with mobile stations such as mobile station 102 over an air interface. As such, wireless communication interface 310 may be configured to provide coverage area 104. And other entities not shown in FIG. 3 may be present as well. Source base station 110 may contain the same or similar entities as target base station 106, and may be similarly configured to provide source coverage area 108. Source base station 110 and/or target base station 106 may take the form of a macro base station and/or a femtocell, among other possibilities.

Figure 4:
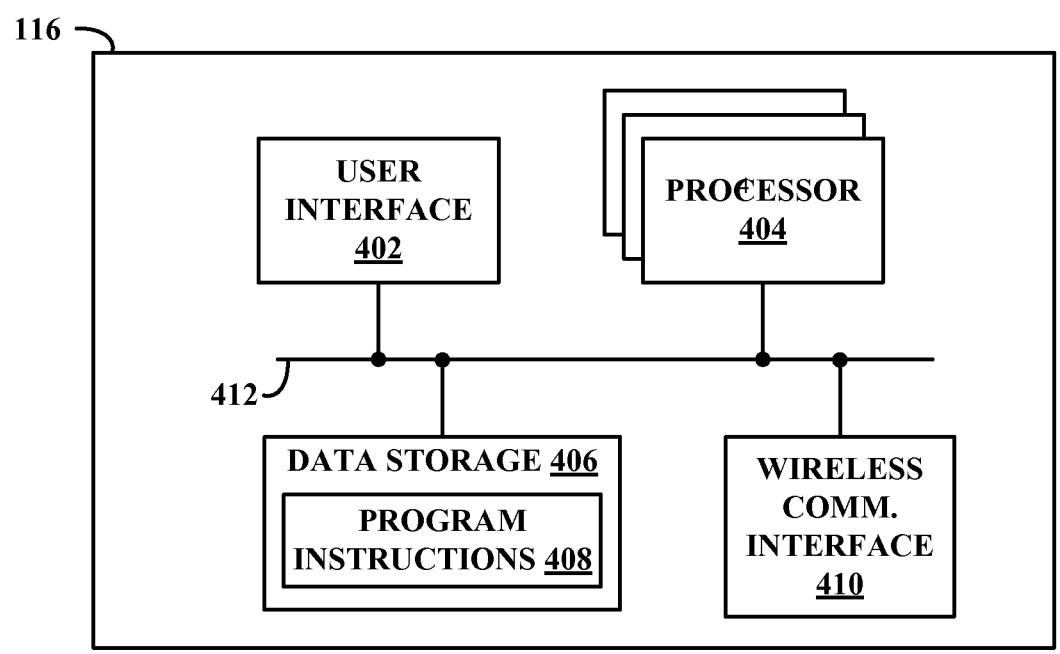
FIG. 4 is a simplified block diagram of a wireless communication device, in accordance with exemplary embodiments.

FIG. 4 is a simplified block diagram of wireless communication device 116, which may be used in accordance with exemplary embodiments. As illustrated, wireless communication device 116 may include a user interface 402, a processor 404, data storage 406 (containing program instructions 408), and wireless communication interface 410, all connected by a bus or other communication medium 412. The entities shown in FIG. 4 may operate in a manner similar to those entities of the same name that are depicted in FIGS. 2 and 3. Further, wireless communication interface 410 may include a mobile-station modem for facilitating communication with source base station 110, target base station 106, and/or mobile station 102, among other possibilities. And other entities not shown in FIG. 4 may be present as well. Wireless communication device 116 may take the form of a macro base station, a femtocell, a device designed and dedicated for carrying out the present methods and systems, and/or a personal wireless router (i.e., mobile hotspot), among other possibilities.

With reference to FIG. 1, routing path 112a may include one or more wired connections and/or one or more wireless connections. Additionally, there could be one or more devices and/or networks making up at least part of one or more of any of the communication links described herein.

Endpoint 114 may be any entity capable of engaging in a communication session with mobile station 102. As such, endpoint 114 could be a mobile station, a telephone, a server, a computer, and/or a Voice over Internet Protocol (VoIP) endpoint. Those having skill in the art will recognize that endpoint 114 may take the form of any other device without departing from the scope of the claims.

Figure 5:
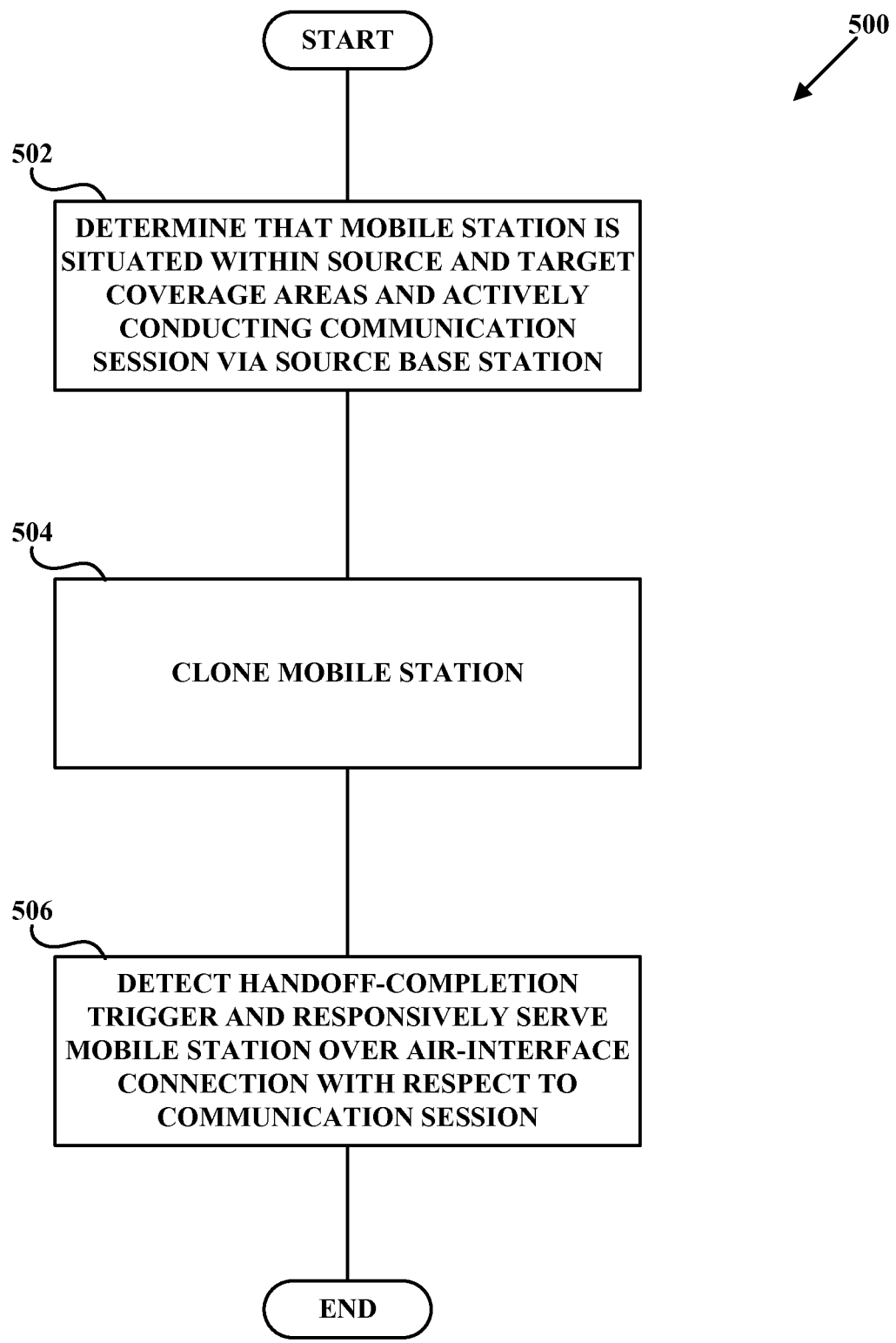
FIG. 5 is a flowchart of a method that can be carried out in accordance with exemplary embodiments.

FIG. 5 depicts a flowchart of a method, in accordance with exemplary embodiments. Though method 500 is described below as being carried out by target base station 106, all or part of the method can also be carried out by mobile station 102, wireless communication device 116, any other network entity mentioned herein, and/or any other entity.

As shown in FIG. 5, method 500 begins at step 502 with target base station 106 making a determination that mobile station 102 is (i) situated within target coverage area 104 of target base station 106, (ii) situated within source coverage area 108 of source base station 110, and (iii) actively conducting a communication session with endpoint 114 via source base station 110. A depiction of the situation identified in step 502 is shown in FIG. 1. As shown, mobile station 102 is actively conducting a communication session with endpoint 114 over routing path 112a and air-interface connection 112b.

In an embodiment, target base station 106 determines that mobile station 102 is situated within target coverage area 104 by receiving a message from mobile station 102 that the mobile station is within the target coverage area. Mobile station 102 may determine that it is within the target coverage area by using location module 214, for example, or perhaps by determining that a power level of a forward-link signal sent from target base station 106 to the mobile station is above a predetermined threshold such that the mobile station could be served by the target base station over an air-interface connection. Other means for mobile station 102 to determine that it is within target coverage area 104 are possible as well.

The mobile station 102 may then send a message to target base station 106 that includes data indicating that the mobile station is within target coverage area 104. The message could be sent, for example, via source base station 110 over air-interface connection 112b, perhaps using an SMS message or an IP packet, or could be sent directly to target base station 106, among other possibilities.

In another embodiment, target base station 106 determines that mobile station 102 is situated within target coverage area 104 by detecting the presence of the mobile station within the target coverage area. Detecting the presence of mobile station 102 could include determining that the power level of a reverse-link signal sent from the mobile station and as received by target base station 106 is above a predetermined threshold such that the target base station would be able to serve mobile station 102 over an air-interface connection. As another example, target base station 106 may coordinate with one or more other base stations to triangulate a position of mobile station 102 to determine that the mobile station is within coverage area 104. Those having skill in the art will recognize that other methods of determining that mobile station 102 is within coverage area 104 may be used without departing from the scope of the claims.

Determining that mobile station 102 is situated within source coverage area 108, and/or that mobile station 102 is actively conducting a communication session with endpoint 114 via source base station 110, may include steps similar to determining that the mobile station is within target coverage area 104. As such, target base station 106 may make either determination by, for example, receiving a message from mobile station 102 that the mobile station is situated within coverage area 108 and/or conducting a communication session with endpoint 114, or detecting that either or both of these conditions are be true. Note that the aspect of the determination of step 502 regarding the endpoint is not specific to a given endpoint; rather this is a determination that the mobile station is actively engaged in a communication session with an endpoint.

The communication session with endpoint 114 could include, for example, a voice call. Additionally or alternatively, the communication session could include a packet-data session. Other types of communication sessions may be involved as well, without departing from the scope of the claims.

Conducting the communication session includes operating using an identifier that uniquely identifies at least the communication session to the source base station. In an embodiment, the identifier includes data that uniquely identifies the mobile station on a permanent basis. In this embodiment, the data could include, for example, an electronic serial number (ESN) and/or a media access control (MAC) address. In another embodiment, the identifier includes data that uniquely identifies the mobile station on at least a semi-permanent basis. In this embodiment, the data could include, for example, a mobile identification number. In an additional embodiment, the identifier includes data that uniquely identifies the mobile station on at least a temporary basis. In this embodiment, the data could include, for example, a Walsh code, an internet protocol (IP) address, and/or a SIP identifier.

FIG. 1 depicts mobile station 102 operating using an identifier that uniquely identifies at least the communication session to source base station 110. As shown, mobile station 102 is operating using SIP identifier 34567@sprint.com. Accordingly, mobile station 102 will receive communication sent from source base 110 that is intended for a mobile station identified at least by that SIP identifier. Because this identifier uniquely identifies the communication session to source base station 110, no other device being served by source base station 110 will send or receive (i.e., decode) communication related to that communication session (unless mobile station 102 is cloned, as explained below).

Method 500 continues at step 504 with target base station 106, in response to making the determination, cloning mobile station 102. Cloning the mobile station includes configuring wireless communication device 116 to begin operating in source coverage area 108 using the above-referenced identifier.

Figure 6:
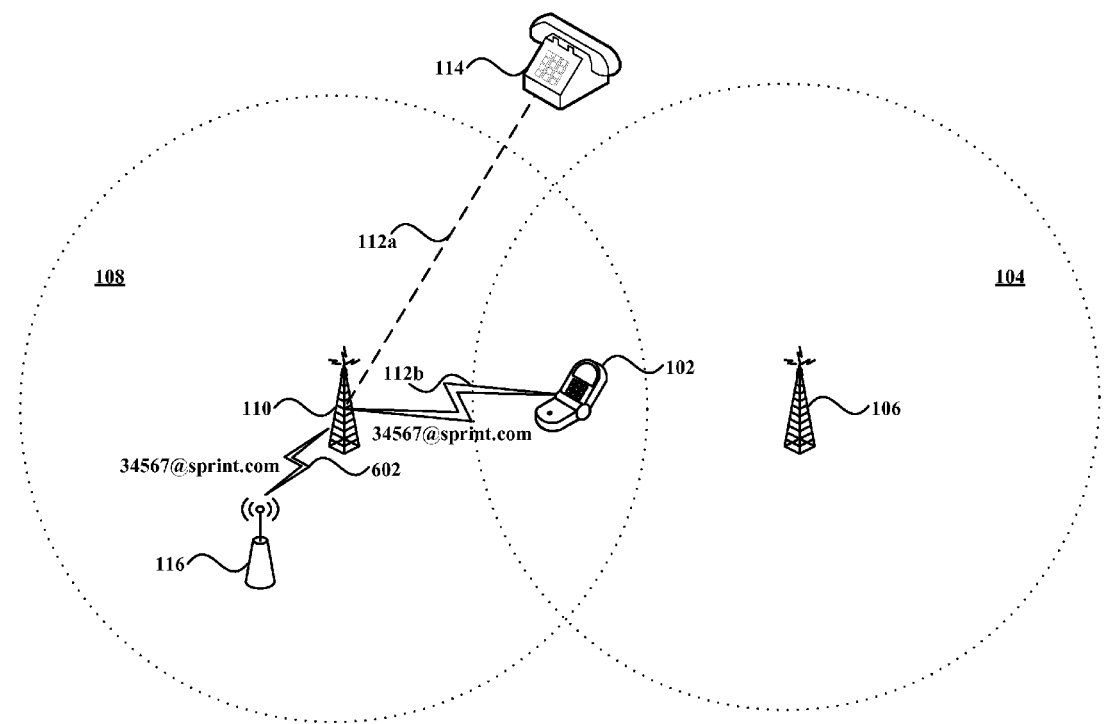

A depiction of wireless communication device 116 operating in source coverage area 108 using the identifier is shown in FIG. 6. Because wireless communication device 116 is operating using the same identifier as mobile station 102, wireless communication device 116 is able to send and receive, over communication link 602, communication intended for the mobile station identified by that unique identifier (i.e., mobile station 102). Accordingly, both mobile station 102 and wireless communication device 116 receive communication intended for mobile station 102.

Operating in source coverage area 108 using the identifier includes relaying the communication session between source base station 110 and mobile station 102. In an embodiment, relaying the communication session between source base station 110 and mobile station 102 includes relaying the communication session over a communication path that includes target base station 106. For example, as shown in FIG. 7a, the communication path could include (wired and/or wireless) communication link 702 between wireless communication device 116 and target base station 106, and new air-interface connection 704 between the target base station and mobile station 102.

In another embodiment, relaying the communication session between the source base station and the mobile station includes relaying the communication session over a communication path that does not include the target base station. For example, as shown in FIG. 7b, the communication path could be or at least include a wireless communication link 706 between wireless communication device 116 and mobile station 102. Additionally or alternatively, communication link 706 could be wired at least in part. Those having skill in the art will recognize that other communication paths, communication links, and other means of relaying the communication session are possible without departing from the scope of the claims.

Figure 7A:
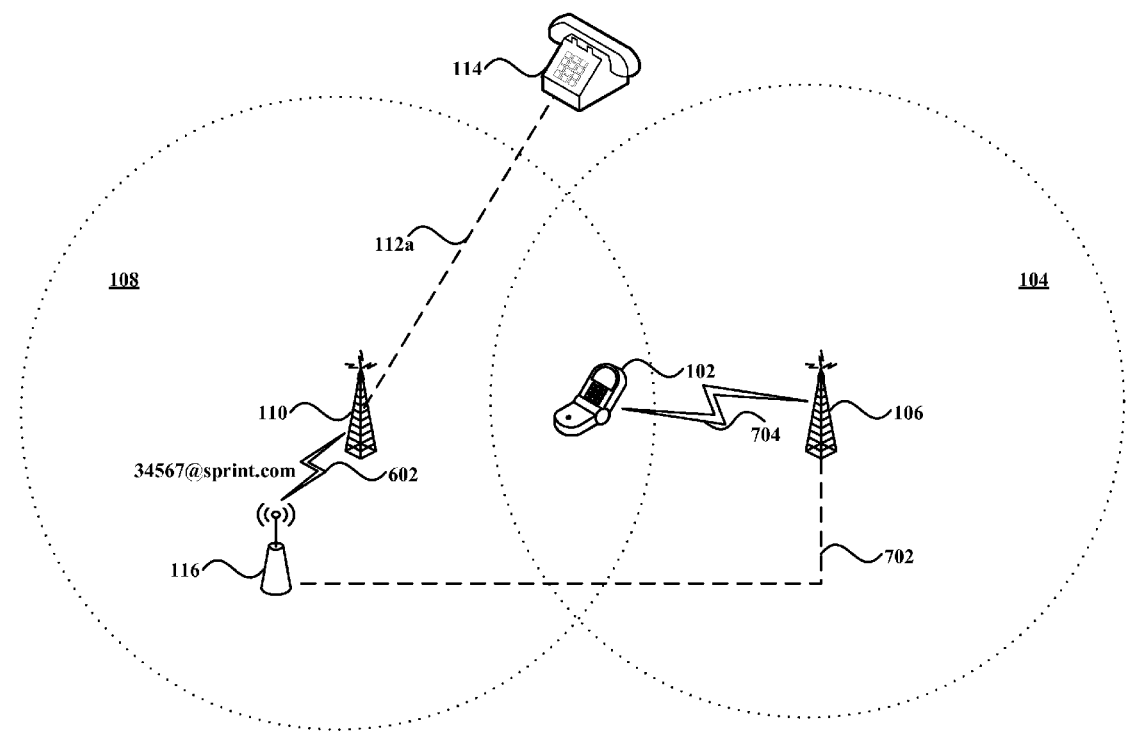
Figure 7B:
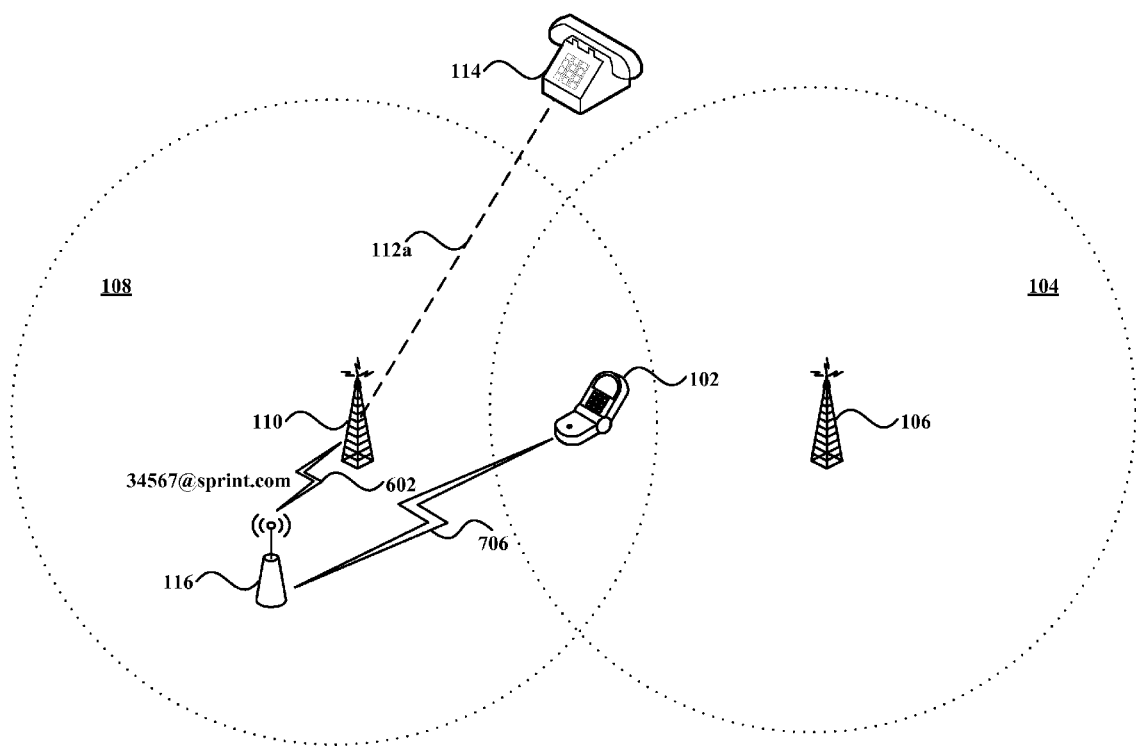

Note that, in FIG. 7a, air-interface connection 112b is not depicted. If mobile station 102 is able to operate on only one radio access network (e.g., only one CDMA network) at a time, then the mobile station must tear down air-interface connection 112b in order to be able to then establish new air-interface connection 704. Similarly, as shown in FIG. 7b, if mobile station 102 is able to operate on only one wireless connection at a time, then mobile station 102 may need to tear down air-interface connection 112b in order to establish communication link 706. However, mobile station 102 may be able to maintain air-interface connection 112b while establishing communication link 704 and/or 706 if the mobile station includes optional additional wireless communication interface 212.

In some embodiments, wireless communication device 116 may be situated within target coverage area 104. In other embodiments, wireless communication device 116 may be situated outside of target coverage area 104. In embodiments such as that depicted in FIG. 7a, mobile station 102 could communicate over a wired and/or wireless connection with target base station 106, perhaps involving a high-power wireless connection and/or a wired connection. Other methods of connecting wireless communication device 116 to target base station 106 are possible when the wireless communication device is outside of target coverage area 104. Moreover, wireless connection device 116 need not necessarily be connected to target base station 106, such as in embodiments such as that depicted in FIG. 7b.

In an exemplary embodiment, wireless communication device 116 simulates an operational characteristic of mobile station 102. Simulating an operational characteristic could help to prevent source base station 110 from determining that wireless communication device 116 is a clone that is relaying the communication session. For example, wireless communication device 116 may operate to prevent source base station 110 from suspecting that mobile station 102 almost instantaneously moved to the location of wireless communication device 116. In this situation, source base station 110 may determine that mobile station 102 has been cloned and may responsively terminate the communication session, preventing the session from being transitioned to target base station 106.

Simulating the operational characteristic could include reporting the operational characteristic to base station 110. For example, wireless communication device 116 could determine the location of mobile station 102 and report that location (rather than its own location) to base station 110.

Additionally or alternatively, simulating the operational characteristic could include wireless communication device 116 operating so as to approximate the operational characteristic as perceived by base station 110. For example, wireless communication device 116 could determine that, based on the location of mobile station 102, the power level of a signal received by base station 110 (and sent by mobile station 102) would be a certain power level. If wireless communication device 116 were located substantially closer in proximity to source base station 110, but operating at the same power level as mobile station 102, then base station 110 may detect a sudden and unexpected increase in the power level of the signal associated with the communication session. Accordingly, wireless communication device 116 may operate so as to approximate the power level as perceived by source base station 110 by transmitting at half of the power level as mobile station 102 so that the power level of the signal received by base station 110 will be substantially the same. Other means of simulating the operational characteristic are possible as well without departing from the scope of the claims.

Method 500 continues at step 506 with target base station 106, while wireless communication device 116 is operating in source coverage 108 area using the identifier, (i) establishing an air-interface connection with mobile station 102, (ii) detecting a handoff-completion trigger, and (iii) responsive to detecting the handoff-completion trigger, serving mobile station 102 over that new air-interface connection with respect to the communication session.

Figure 8:
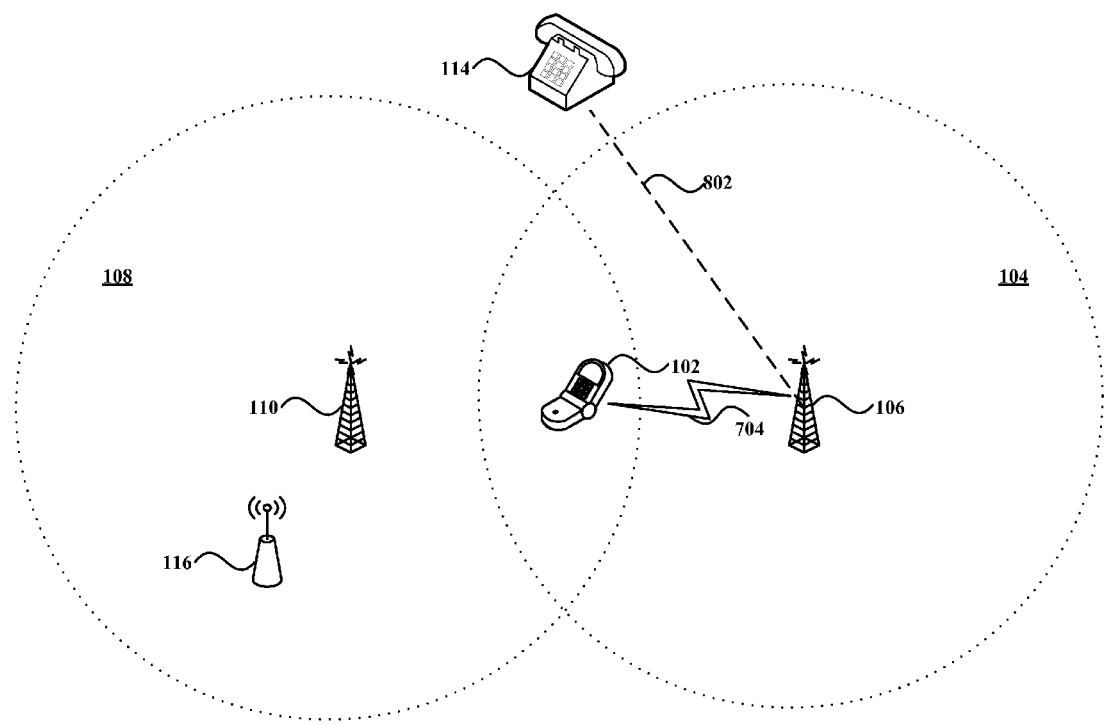

FIG. 8 depicts operating conditions once target base station 106 has begun serving mobile station 102 over the new air interface with respect to the communication session. As shown, the communication session is no longer being conducted over routing path 112a, over wireless link 602, over communication link 702, or over communication link 706. Instead, target base station 106 serves mobile station 102 with respect to the communication session over new air-interface connection 704, and the communication session is being conducted over routing path 802 between endpoint 114 and target base station 106.

The handoff-completion trigger could be, for example, a message received by target base station 106 from another entity, such as mobile station 102, endpoint 114, or any other entity in communication with target base station 106. Additionally or alternatively, the handoff-completion trigger could be a determination by base station 106 that a certain condition exists—for example, that routing path 802 has been established, perhaps responsive to a command sent to one or more routing nodes to change the routing of the communication session from including routing path 112a to including routing path 802. Those having skill in the art will recognize that other handoff-completion triggers may be used without departing from the scope of the claims.

To prevent source base station 110 from attempting to terminate the communication session, the target base station (or another network entity) may send a message to endpoint 114 or another entity (such as a router or switch) indicating that the communication session should not be terminated by base station 110. The message may include instructions to deny source base station 110 permission to terminate the session, or may include information indicating that instructions by source base station 110 to terminate the session are stale and should not be executed. Those having skill in the art will recognize that there are many other ways of preventing the termination of the communication session by source base station 110 and/or any other entity or entities associated therewith out departing from the scope of the claims.

Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

I claim:

1. A method comprising:
    making a determination that a mobile station is (i) situated within a target coverage area of a target base station, (ii) situated within a source coverage area of a source base station, and (iii) actively conducting a communication session with an endpoint via the source base station, wherein conducting the communication session comprises operating using an identifier that uniquely identifies at least the communication session to the source base station;
    cloning the mobile station in response to the determination being made, wherein cloning the mobile station comprises configuring a wireless communication device other than the mobile station to begin operating in the source coverage area using the identifier, wherein operating in the source coverage area using the identifier comprises relaying the communication session between the source base station and the mobile station, wherein the wireless communication device relaying the communication session between the source base station and the mobile station involves the communication session passing along a communication path that includes the wireless communication device; and
    while the wireless communication device is operating in the source coverage area using the identifier, the target base station (i) establishing an air-interface connection with the mobile station, (ii) detecting a handoff-completion trigger, and (iii) responsive to detecting the handoff-completion trigger, serving the mobile station over the air-interface connection with respect to the communication session.

2. The method of claim 1, wherein the mobile station comprises at least one of a mobile phone, a personal digital assistant, a portable wireless router, a computer, and an e-book reader.

3. The method of claim 1, wherein at least one of the source coverage area and the target coverage area comprises a coverage area selected from the group consisting of a cell and a sector.

4. The method of claim 1, wherein at least one of the source base station and the target base station comprises a base station selected from the group consisting of a macro base station and a femtocell.

5. The method of claim 1, wherein the communication session comprises at least one of a voice call and a packet-data session.

6. The method of claim 1, wherein the identifier comprises data that uniquely identifies the mobile station on a permanent basis.

7. The method of claim 6, wherein the data comprises an electronic serial number.

8. The method of claim 1, wherein the identifier comprises data that uniquely identifies the mobile station on at least a semi-permanent basis.

9. The method of claim 8, wherein the data comprises a mobile identification number.

10. The method of claim 1, wherein the identifier comprises data that uniquely identifies the mobile station on at least a temporary basis.

11. The method of claim 10, wherein the data comprises at least one of a Walsh code and an IP address.

12. The method of claim 1, wherein the communication path does not include the target base station.

13. The method of claim 12, wherein the communication path comprises a wireless link between the wireless communication device and the mobile station.

14. The method of claim 1, wherein the communication path includes the target base station.

15. The method of claim 14, wherein the communication path comprises (i) a communication link between the wireless communication device and the target base station and (ii) the air-interface connection.

16. The method of claim 15, wherein the communication link comprises a wired link.

17. The method of claim 15, wherein the communication link comprises a wireless link.

18. The method of claim 1, wherein the wireless communication device is situated within the target coverage area.

19. The method of claim 1, wherein the wireless communication device is not situated within the target coverage area.

20. The method of claim 1, further comprising the wireless communication device simulating an operational characteristic of the mobile station.

21. The method of claim 20, wherein simulating the operational characteristic comprises reporting the operational characteristic to the source base station.

22. The method of claim 20, wherein simulating the operational characteristic comprises operating so as to approximate the operational characteristic as perceived by the source base station.

23. The method of claim 20, wherein the operational characteristic comprises at least one of a location of the mobile station and a reverse-link power level of the mobile station.

24. A target base station comprising:
a wireless communication interface;
a processor; and
data storage having instructions stored thereon that, if executed by the processor, cause the target base station to carry out functions including:
- making a determination that a mobile station is (i) situated within a target coverage area of the target base station, (ii) situated within a source coverage area of a source base station, and (iii) actively conducting a communication session with an endpoint via the source base station, wherein conducting the communication session comprises operating using an identifier that uniquely identifies at least the communication session to the source base station;
- in response to the determination being made, cloning the mobile station, wherein cloning the mobile station comprises configuring a wireless communication device other than the mobile station to begin operating in the source coverage area using the identifier, wherein operating in the source coverage area using the identifier comprises relaying the communication session between the source base station and the mobile station, wherein the wireless communication device relaying the communication session between the source base station and the mobile station involves the communication session passing along a communication path that includes the wireless communication device; and
- while the wireless communication device is operating in the source coverage area using the identifier, (i) establishing an air-interface connection with the mobile station, (ii) detecting a handoff-completion trigger, and (iii) responsive to detecting the handoff-completion trigger, serving the mobile station over the air-interface connection with respect to the communication session.

25. The target base station of claim 24, wherein the data storage further comprises instructions for causing the wireless communication device to simulate an operational characteristic of the mobile station.

* * * * *